Sept. 2, 1941.  C. G. HOOVER  2,254,778
TIRE CONSTRUCTION
Filed March 24, 1937  2 Sheets-Sheet 1

INVENTOR
Clair G. Hoover
BY Albert L. Ely
ATTORNEY

Sept. 2, 1941.    C. G. HOOVER    2,254,778
TIRE CONSTRUCTION
Filed March 24, 1937    2 Sheets-Sheet 2

INVENTOR
Clair G. Hoover
BY
Albert L. Ely
ATTORNEY

Patented Sept. 2, 1941

2,254,778

UNITED STATES PATENT OFFICE 2,254,778

TIRE CONSTRUCTION

Clair G. Hoover, Akron, Ohio, assignor to The Firestone Tire & Rubber Company, Akron, Ohio, a corporation of Ohio Application March 24, 1937, Serial No. 132,755

1 Claim. (Cl. 152—209)

This invention relates to improvements in tire construction, and more especially it relates to improvements in the traction characteristics of the tread portion of pneumatic tires.

The chief objects of the invention are to provide a tire that will be quiet in operation; that will have good tractive qualities; and to provide a tire tread wherein the tractive elements will not be subject to excessive wear. Other objects will be manifest as the specification proceeds.

Figure 1:
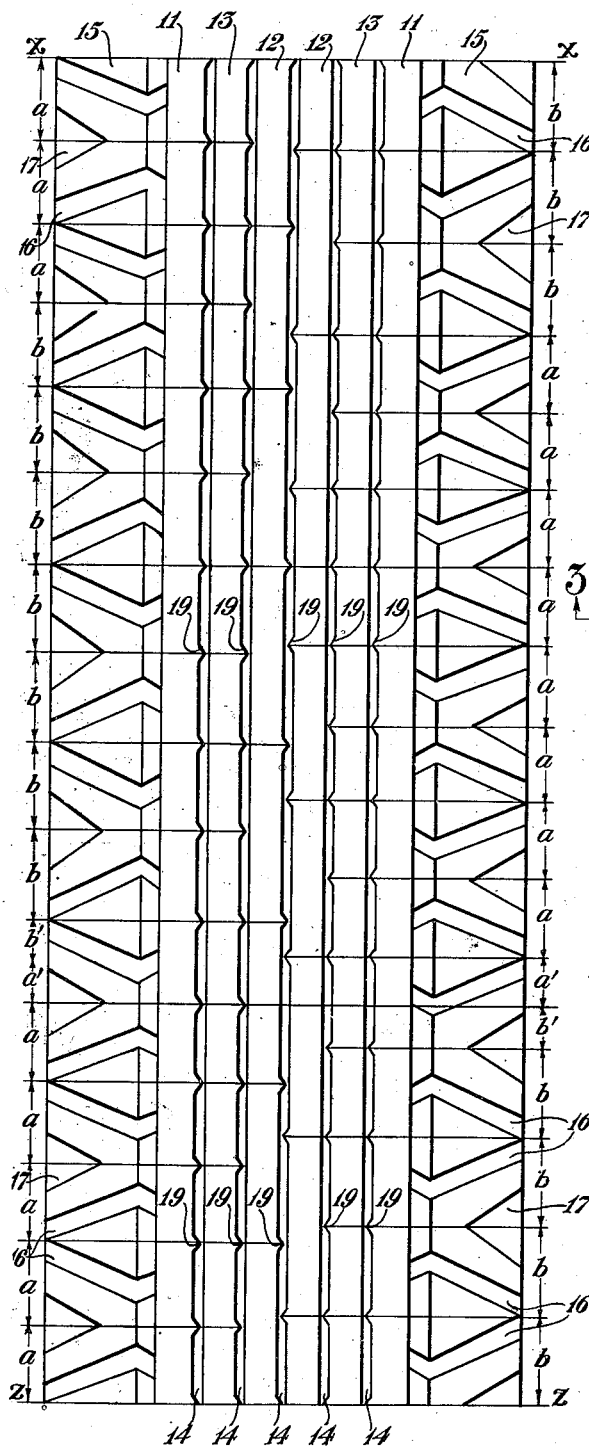
Figure 1 is a developed plan view showing the pattern of the improved tire tread.

Referring to the drawings, there is shown at 10 a pneumatic tire casing that has its outer peripheral region provided with a tread structure comprising a plurality of continuous, parallel, circumferentially extending ribs. Said ribs are shown as six in number, those at the respective lateral margins of the tread being designated 11, 11, those in the medial region of the tread immediately each side of the central plane of the tire being designated 12, 12, and those intermediate the ribs 11, 12 being designated 13. The aforesaid ribs are separated by continuous, circumferentially extending grooves 14, 14.

The shoulders 15, 15 of the tire casing slope from the outer lateral margins of ribs 11 to the sidewalls of the tire, and said sloped surfaces are formed with grooves 16, 16 and recesses 17, 17 that define recurring designs or characters around the tire on each side thereof. These designs give to the tire a distinctive, characteristic appearance. They are disposed entirely inwardly of the peripheral face of the tread, but under some conditions, as in deep mud or snow, they may provide additional traction for the tire.

Figure 2:
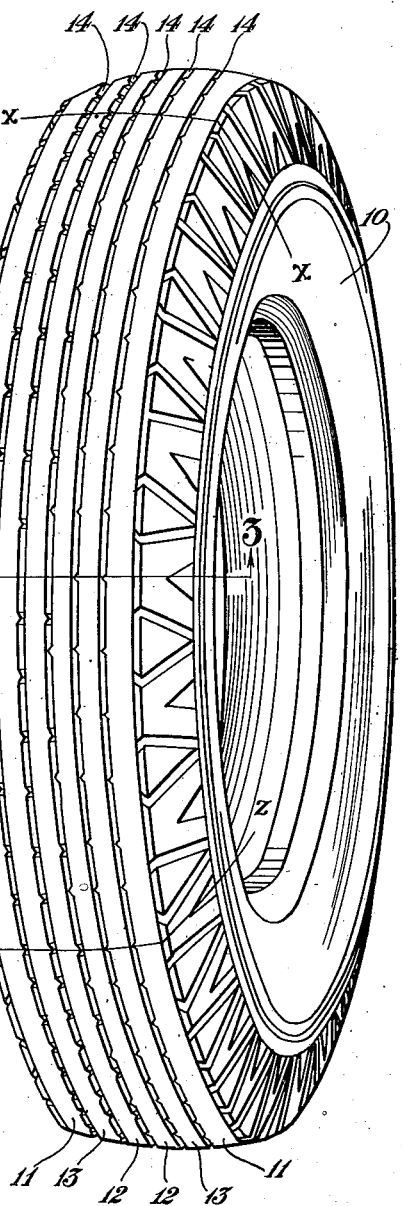
Figure 2 is a perspective view of a tire casing comprising the improved tread.
Figure 3:
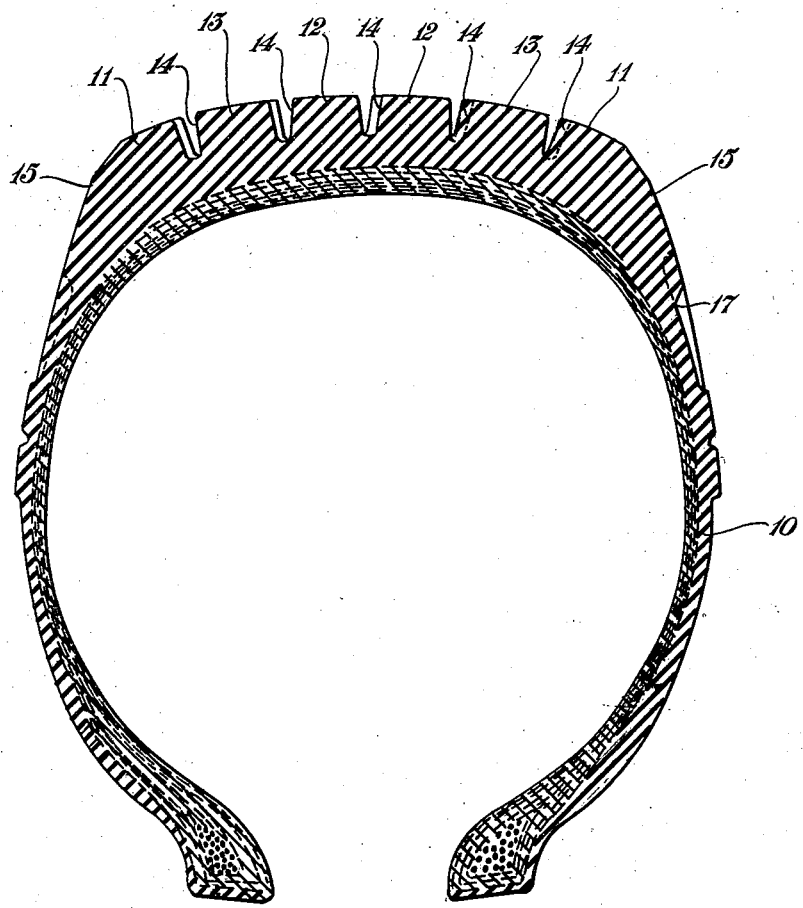
Figure 3 is a section, on a larger scale, on the line 3—3 of Figure 2.

The individual designs or characters defined by the grooves 16 and recesses 17 are of two different sizes or widths, and are symmetrically disposed about the tire according to a determinate arrangement, which arrangement is such that the designs on one side of the tread never are transversely aligned with those on the other side of the tread. The arrangement is shown most clearly in Figures 1 and 2 wherein that portion of the tread that lies between lines $x$—$x$ and $z$—$z$ constitutes exactly one-fourth of the total linear extent of the tread. The two different sizes of sidewall characters are spaced differently between adjacent characters, one spacing being indicated by the letters $a$ and the other spacing by the letters $b$, the letters $a'$ and $b'$ indicating half-spaces. In the region between lines $x$—$x$ and $z$—$z$, on each side of the tire, there are 8½ spaces $a$ and 7½ spaces $b$ on each side of the tread, the series of spaces $a$ on one side of the tread being opposite the series of spaces $b$ on the other side of the tread. The asymmetrical arrangement of the lateral tire designs is such as to prevent resonance of sounds arising from use of the tire, thereby making for quietness of operation.

To improve the tractive qualities of the ribs 11, 12, and 13, each of them is provided, on its side nearest the centerline of the tread, with a circumferential series of integral, laterally extending projections or lugs 19, 19. These lugs preferably are wedge shape in plan, as shown, and extend part way across the grooves 14. The arrangement of the lugs 19 longitudinally of the ribs bears a determinate relationship to the spacing of the lateral designs formed by the grooves 16 and recesses 17. On each lateral rib 11 and intermediate rib 13 the lugs 19 are aligned with each space $a$ and $b$ of the designs on the same side of the tread. On each medial rib 12 the lugs 19 are transversely aligned with the lugs of adjacent ribs 13 and 11, but are double spaced so as to be aligned only with alternate lugs on the latter. It will be seen that the lugs 19 of ribs 12 extend into the same groove 14, which groove is disposed along the centerline of the tread, and that the spacing between adjacent lugs varies in extent according to a definite pattern, but that the lugs on opposite ribs 12 never are aligned with each other. The arrangement provides the same lack of symmetry of the series of lugs on opposite sides of the centerline of the tread as exists in the designs defined by the grooves 16 and recesses 17 at each side of the tread, and thus results in quietness of operation.

The staggering and progressive variation in spacing of lugs 19 on the opposite sides of the centerline of the tread prevents the setting up of objectionable tones having periodic frequencies. Inasmuch as the sloping shoulders 15, 15 do not normally contact the road surface, the grooves 16, 16 and recesses 17, 17 may be equally spaced if desired, or omitted entirely, leaving only lugs 19, 19 in asymmetrical arrangement.

Another feature of the tread that makes for quietness of operation is the absence of recesses or notches in the ribs on the opposite sides of the grooves from the lugs 19. In tire treads formed with such notches there is excessive wear and "cupping" of the ribs around the notches so that the present construction results in improved wear.

Another distinctive feature of the invention is the absence of projections or lugs on the sides of the ribs remote from the centerline of the tread, all such lugs being directed toward said centerline. The arrangement provides adequate traction and skid-resisting qualities, and avoids "undercutting" which occurs on projections directed away from the centerline of the tread, but does not occur on oppositely directed lugs.

Modification may be resorted to without departing from the spirit of the invention or the scope of the appended claim.

What is claimed is:

A tire structure comprising a tread portion that is formed with a plurality of circumferentially extending ground engaging ribs that are separated by continuous intervening grooves, each rib being formed solely on the lateral face thereof that is nearest the central plane of the tire with a circumferential series of wedge-shaped lugs that extend partly across a groove and have their apexes directed toward the plain smooth lateral surface of the adjacent rib.

CLAIR G. HOOVER.